2,864,816
WATER-INSOLUBLE MONOAZO DYESTUFFS

Bruno J. R. Nicolaus, Basel, and Ernest Merian, Bottmingen, Switzerland, assignors to Sandoz A. G., Basel, Switzerland, a Swiss firm No Drawing. Application May 27, 1957
Serial No. 661,595

Claims priority, application Switzerland June 21, 1956

7 Claims. (Cl. 260—207)

The present invention relates to new water-insoluble monoazo dyestuffs which correspond to the formula

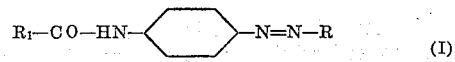
(I)

wherein R stands for the radical of a hydroxybenzene which has a molecular weight below 125 and is coupled in the ortho-position to the hydroxy group and $R_1$ stands for a phenyl radical which may be further substituted by a methyl group.

The process for their production consists in uniting 1 mol of the diazo compound of a 1-amino-4-benzoylaminobenzene, which may be substituted in the benzoyl radical by a methyl group, with 1 mol of a hydroxybenzene having a molecular weight less than 125 and coupling in the ortho-position to the hydroxy group.

A further operating procedure of the process consists in reacting 1 mol of an aminomonoazo compound of the formula

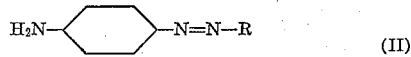
(II)

wherein R has the aforementioned significance, with 1 mol of a functional derivative of benzenecarboxylic acid which may be further substituted in the nucleus by a methyl group.

Examples of suitable hydroxybenzenes coupling in the ortho-position to the hydroxy group are 1-hydroxy-4-methylbenzene, 1-hydroxy-4-ethylbenzene and 1-hydroxy-4-methoxybenzene.

The coupling of the diazo compound with the azo component in the first operating procedure of the process is carried out in alkaline medium.

The reaction of the aminomonoazo compounds (II) with the functional derivatives of the benzene-carboxylic acid according to the second operating procedure of the invention is conducted advantageously in solution (e. g. in an indifferent organic solvent) or in very fine aqueous suspension, preferably in the presence of a proton acceptor. The reaction temperature may vary within wide limits, depending on the procedure adopted.

The dyestuffs are isolated by one of the standard basic operations such as filtration, evaporation of the solvent, or precipitation from the solvent by means of a suitable agent, etc.

The new water-insoluble monoazo dyestuffs yield yellow shades on synthetic polyamide fibers, e. g. nylon, Perlon, Grilon, Rilson (registered trademarks); terephthalic acid ester fibers, e. g. Terylene, Dacron (registered trademarks); cellulose ester fibers, e. g. secondary cellulose acetate and triacetate; and polyvinyl fibers, whereas they reserve very well cotton, viscose filament yarn and viscose staple fiber.

Some of the new dyestuffs are also suitable for pigmenting lacquer media, oils and synthetic resins, and for dyeing man-made fibers in the mass. A number of them dye wool and silk as well.

The new water-insoluble monoazo dyestuffs are dyed on secondary cellulose acetate and triacetate, polyamide fibers and terephthalic acid ester fibers from suspension, preferably in the presence of compounds with dispersing action and at elevated temperature. Their dyeings on polyamide and polyester fibers are markedly superior in washing fastness at 60° C. and 71° C. to those produced with the known dyestuff acetyl-p-phenylenediamine→p-cresol, and are characterized both on cellulose ester and ether fibers and on polyamide and polyester fibers by better sublimation fastness and heat-setting properties. The dyeings also possess very good fastness to light, gas fumes, sea water, dry-cleaning, crocking, potting, pressing and perspiration. They are dischargeable and exhibit good fastness to acids, alkali, sulfite, bleaching and alkaline milling.

In the following examples the parts and percentages are calculated by weight. The temperatures are given in degrees centigrade and the melting points are uncorrected.

EXAMPLE 1

21.2 parts of 1-amino-4-benzoylaminobenzene, M. P. 127–128°, are finely pulverized and dispersed in 152 parts of hydrochloric acid 8%. The fine suspension is cooled to 0° with thorough stirring, after which a solution of 7 parts of sodium nitrite and 50 parts of water is added to it. The resultant diazo solution is united in the normal manner with a solution of 11.4 parts of 1-hydroxy-4-methylbenzene in 250 parts of water, 4 parts of sodium hydroxide and 20 parts of sodium carbonate at 3–5°. On completion of coupling the dyestuff is separated, washed neutral and dried. A good yield of 1-(2'-hydroxy-5'-methyl)-phenylazo-4-benzoylaminobenzene is obtained. The new product can be dissolved in alcohol and reprecipitated and then has a melting point at 177°. It dissolves in acetic ester with a greenish yellow coloration and in concentrated sulfuric acid with a yellow coloration. Yellow shades of excellent fastness to washing and sea water are obtained with it on secondary cellulose acetate and cellulose triacetate, terephthalic acid ester fibers and polyamide fibers. The dyeings are dischargeable, fast to light, sublimation, gas fumes and perspiration, and very fast to pressing and heat-setting.

A dyebath is prepared with 0.6 part of the above-described dyestuff dispersed with turkey red oil, 6 parts of a sulfonated fatty alcohol, and 3000 parts of water. 100 parts of secondary cellulose acetate are entered into the bath at room temperature. The bath is heated to 80° in 1 hour and held at this temperature for a further hour. After this time the dyeing process is completed. The material is removed, rinsed and dried.

Dacron fiber is dyed by one of the following methods: A dyebath is prepared with 0.6 part of the dyestuff of Example 1, dispersed with Turkey red oil, 6 parts of a sulfonated fatty alcohol and 3000 parts of water. 100 parts of Dacron are introduced into the bath at room temperature, the bath then being raised to 55–60°. 20 parts of a technical mixture of chlorobenzene and dichlorobenzene are then added, and the dyebath heated further to the boil. Dyeing is continued for 1½ hours at the boil. After this time the dyeing process is completed, and the dyed Dacron is removed, rinsed and dried.

100 parts of Dacron are treated in a cold solution of 15 parts of diammonium phosphate and 3000 parts of water. 15 parts of the sodium salt of o-hydroxydiphenyl are subsequently added, the solution then being heated to 55–60°. At this temperature 0.6 part of the concentrated dyestuff, dispersed with Turkey red oil and 6 parts of a sulfonated fatty alcohol, are added. The bath is heated to the boil and dyeing continued for 1 hour at the boil. After this time the dyeing process is completed. The material is removed, rinsed and dried. To remove the excess o-hydroxydiphenyl the material is heated for a short time at 195°.

A dyebath is prepared in a high temperature dyeing machine with 0.6 part of the dyestuff dispersed with Turkey red oil, 6 parts of a sulfonated fatty alcohol, and 3000 parts of water. 100 parts of Dacron are entered into the bath at room temperature. The machine is closed and the bath heated to 125° in the course of 1 hour and held at this temperature for 30 minutes. After this time the dyeing process is completed. The material is removed, rinsed and dried.

To improve its dispersibility the dyestuff can be ground before dyeing with suitable wetting, dispersing or emulsifying agents, preferably in the presence of inorganic salts, for example Glauber's salt. It can also be intimately mixed as an aqueous paste with a dispersing agent, and converted into a dyestuff powder by suitable drying.

EXAMPLE 2

21.3 parts of 2′-hydroxy-4-amino-1.1′-azobenzene are dissolved in 150 parts of anhydrous pyridine. With good external cooling and vigorous stirring the solution is drop-fed with 15 parts of benzenecarboxylic acid chloride, so that the temperature of the mixture does not exceed +20°. After this addition stirring is continued for about 2 hours at room temperature and then for 8 hours at 70°. As soon as the starting product is no longer indicated the reaction mixture is allowed to cool to 20° and diluted with a mixture of 250 parts of water and 200 parts of ice. Upon acidification with hydrochloric acid the precipitated dyestuff is converted into a filterable form. It is separated, washed with ample water, and dried.

A good yield of the 1-(2′-hydroxy)-phenylazo-4-benzoylaminobenzene is obtained. The new product can be recrystallized from alcohol. It dissolves in acetic ester with a greenish yellow coloration and in concentrated sulfuric acid with a yellow coloration. It dyes polyamide and polyester fibers in yellow shades of excellent washing fastness. The dyeings are also dischargeable and fast to sublimation.

The following table contains further water-insoluble monoazo dyestuffs which can be obtained according to the indications given in the Examples 1 and 2. They correspond to the general Formula I and are characterized by the symbols R and R₁ and by the shade of their dyeings on polyester fibers.

Table

| Example No. | R | R₁ | Shade of the dyeing on polyester fibers |
| --- | --- | --- | --- |
| 3 | 2-hydroxyphenyl | 4-methylphenyl | Yellow. |
| 4 | 2-hydroxy-5-methylphenyl | do | Do. |
| 5 | do | 3-methylphenyl | Do. |
| 6 | do | 2-methylphenyl | Do. |
| 7 | 2-hydroxy-5-ethylphenyl | Phenyl | Do. |
| 8 | 2-hydroxy-5-methoxyphenyl | do | Do. |
| 9 | do | 4-methylphenyl | Do. |

The formulae of representative dyestuffs of the foregoing examples are

Example 1

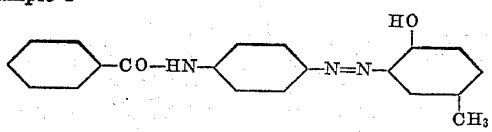

Example 2

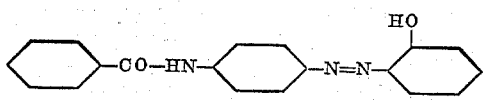

Example 4

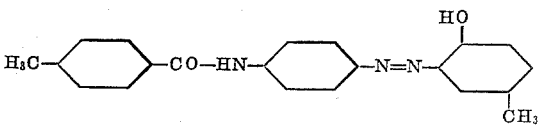

Example 7

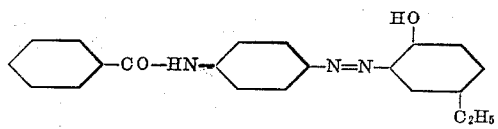

Example 8

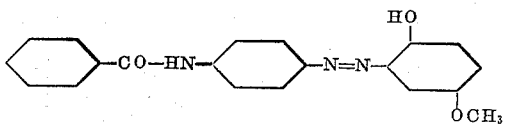

Having thus disclosed the invention what is claimed is:

1. A water-insoluble monoazo dyestuff which corresponds to the formula

wherein R represents the radical of a hydroxybenzene which has a molecular weight below 125 and consists of carbon, hydrogen and oxygen atoms, and is coupled in the ortho-position to the hydroxy group, and $R_1$ represents a member selected from the group consisting of phenyl and methylphenyl.

2. A water-insoluble monoazo dyestuff which corresponds to the formula

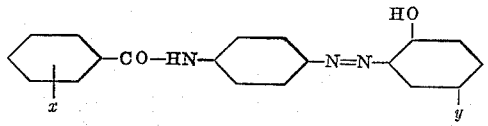

wherein $x$ represents a member selected from the group consisting of hydrogen and methyl, and $y$ represents a member selected from the group consisting of hydrogen, methyl, ethyl and methoxy.

3. The water-insoluble monoazo dyestuff which corresponds to the formula

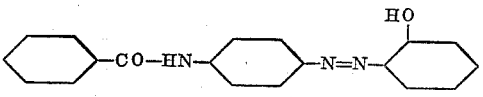

4. The water-insoluble monoazo dyestuff which corresponds to the formula

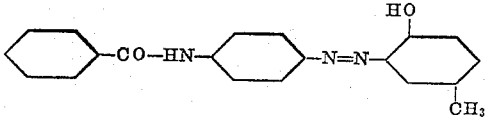

5. The water-insoluble monoazo dyestuff which corresponds to the formula

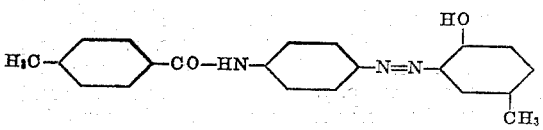

6. The water-insoluble monoazo dyestuff which corresponds to the formula

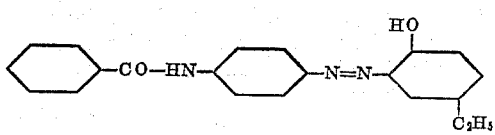

7. The water-insoluble monoazo dyestuff which corresponds to the formula
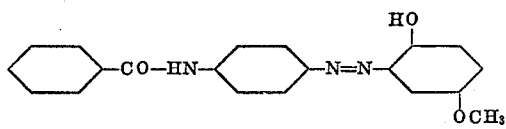
References Cited in the file of this patent
UNITED STATES PATENTS
| | | |
|---|---|---|
| 1,706,484 | Fischer et al. | Mar. 26, 1929 |
| 2,229,200 | Wehrli | Jan. 21, 1941 |
| 2,398,367 | Felix | Apr. 16, 1946 |